(12) United States Patent
Johnson

(10) Patent No.: US 6,264,895 B1
(45) Date of Patent: Jul. 24, 2001

(54) EVAPORATOR

(76) Inventor: Robert S. Johnson, 25 Blue Heron Ave., Hampstead, NH (US) 03841

( * ) Notice: Subject to any disclaimer, the term of this patent is extended or adjusted under 35 U.S.C. 154(b) by 0 days.

(21) Appl. No.: 09/258,605

(22) Filed: Feb. 26, 1999

(51) Int. Cl.$^7$ .................................................. B01L 7/00
(52) U.S. Cl. ..................... 422/101; 422/102; 422/124; 34/80; 34/82
(58) Field of Search .................... 422/101, 102, 422/124; 34/82, 219, 68, 88, 201, 192, 195, 196–198, 200, 224–225, 227, 237, 77–78, 202, 218, 92, 80–81, 90, 71; 159/22–23, 32, 28.6, 29

(56) References Cited

U.S. PATENT DOCUMENTS

| | | | |
|---|---|---|---|
| 2,017,728 | * 10/1935 | Oskamp | 34/197 |
| 3,398,935 | 8/1968 | Livesey et al. . | |
| 3,588,053 | 6/1971 | Rothermel | 259/4 |
| 3,658,047 | * 4/1972 | Happel | 126/21 A |
| 4,465,554 | 8/1984 | Glass | 159/16 R |
| 4,600,473 | 7/1986 | Friswell | 159/47.1 |
| 4,707,452 | 11/1987 | Friswell | 436/177 |
| 4,826,516 | * 5/1989 | Matsuoka et al. | 96/118 |
| 4,922,626 | * 5/1990 | Fiddler | 34/80 |
| 5,215,718 | * 6/1993 | Katzer et al. | 422/102 |

OTHER PUBLICATIONS http://earth1.epa.gov/OST/Methods/1664.html—Method 1664: N–Hexane Extractable Material (HEM) and Silica Gel Treated N–Hexane Extractable Material (SGT–HEM) by Extraction and Gravimetry (Oil and Greease and Total Petroleum Hydrocarbons).

Horizon Technology Application Note: Evaporation Rates and Recovery Data Using the Speed–Vap 9000 Solvent Evaporation System, Apr. 27, 1998.

Horizon Technology—Speed–Vap 9000—Solvent Evaporation System, Apr. 27, 1998.

* cited by examiner

Primary Examiner—W. L. Walker
Assistant Examiner—Marianne Ocampo
(74) Attorney, Agent, or Firm—Hamilton, Brook, Smith & Reynolds, P.C.

(57) ABSTRACT

An evaporator comprises a base with a vacuum connection. A tray is fixed to the base, and has seating positions in which to seat pans which hold sample liquid. A transparent cover is attached to the base with a hinge. The cover fits over the tray and when closed forms a tight fit with the base and is in close proximity to the pans. The cover has inlets angled down at about 37° to 42° over each pan seating position such that when a vacuum source is connected to the vacuum connection, air from outside the evaporator is drawn in through the inlets and aimed toward the sample liquid in each pan such that the solvent evaporates. Pans are preferably commercially available pans which are about 70 mm in diameter and about 16 mm in height, and tapered outwardly towards the top. Preferably, the cover has two inlets for each pan, aimed in opposite directions, and on opposite sides of each pan, such that when air strikes the sample liquid it induces a swirling motion. The vacuum pulls the moisture-carrying air across the tops of the pans and out of the evaporator. Preferably, a heating unit is connected to the base below the tray and heats the sample liquid to a temperature within the range of 20° to 70° Celsius as set by a front panel control. The vacuum is turned off automatically when the cover is opened.

28 Claims, 8 Drawing Sheets

EVAPORATOR

BACKGROUND OF THE INVENTION

Various mechanisms exist for evaporating a solvent from a sample solution in order to extract the solute. Generally, a drying gas is directed across the surface of the solution. For example, U.S. Pat. No. 4,465,554 to Glass discloses a device which evaporates a liquid solvent by impinging a high velocity jet of hot, non-reactive gas on the surface of the liquid. In U.S. Pat. No. 4,707,452 (Friswell), the sample solution is placed in a test tube and a drying gas is directed to flow helically down the side of the tube at a relatively shallow angle. After the gas picks up vapor from the sample, it is withdrawn through an outlet located at the center of the helix. This prevents the incoming and outgoing gases from mixing so that differences between the two gases can be measured.

SUMMARY OF THE INVENTION

Both Glass and Friswell require a supply tube to introduce and aim a jet of drying gas into each sample container. If multiple samples are to be dried at once, a tube must be physically placed into position for each sample. In the present invention, on the other hand, angled inlets are drilled into the top of the unit. An air-drawing source such as a vacuum source pulls room air in through the inlets, creating jets of air which are aimed at the liquid sample. Operation is simple because no tubes need to be inserted into or positioned over the containers. Multiple containers are simply placed in the unit under the inlets.

Thus, in accordance with the present invention, an evaporator comprises one or more pans for holding sample liquid. The pans are positioned or seated within an enclosure which has at least one inlet above each pan. Each inlet is aimed at the sample liquid within the pan. An air-drawing vacuum source, such as a vacuum, is attached directly to the enclosure, and pulls air in through the inlets. The air contacts the sample liquid, and then is withdrawn by the vacuum, creating an air flow across the tops of the pans. Alternatively a fan may be used to draw air through the enclosure.

The pans are preferably tapered outward from bottom to top. Preferably, standard commercially available pans are used which are about 70 mm in diameter and 16 mm high. Of course, other dimensions may be used such as will fit in the chamber while providing sufficient sample surface over which air can effectively flow. Other containers such as beakers may also be used.

In a preferred embodiment, there are two inlets above each pan, at opposite sides of the pan and aimed at the sample liquid in opposite directions. The inlets are aimed downward at about 37° to 42°.

In a preferred embodiment, the evaporator comprises a base with a vacuum connection. A tray, having seating positions in which to seat the pans, is located in the base. A cover is attached to the base with a hinge, and when closed, fits over the tray, forming a tight fit with the base. When the cover is in the closed position, it is preferably ¼" to ½" from the pans. Preferably the cover is transparent to allow observation of the evaporation process.

The cover has angled inlets over each pan seating position such that when a vacuum source is connected to the vacuum connection, air from outside the evaporator is drawn in through the inlets and aimed toward the sample liquid in each pan, inducing a swirling motion in the sample liquid and facilitating evaporation of the sample liquid. Preferably, the vacuum is automatically turned off when the cover is opened.

A heating unit is connected to the base below the tray to warm the sample liquid in the pans to a desired temperature.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A preferred embodiment of the present invention evaporator provides safe and unattended evaporation of up to nine oil and grease extractions. The present invention is designed for bench top operation, yet safely vents all n-hexane vapors to a fume hood. A vacuum is generated to create a gentle flow of air over all samples. Evacuating the n-hexane vapors via vacuum allows the use of an optional in-line solvent recovery system. Utilizing solid state temperature control, the system assures a consistent and gentle heating of all samples. An electrically heated block serves as a dry heat source to avoid water condensation that may occur when using a water bath heating system. The enclosed sample chamber also protects samples from airborne contaminants.

The present invention enhances laboratory productivity by reducing evaporation times by 25–50%. The bench top design frees up valuable hood space while reducing operator exposure to hazardous solvent vapors. The unique heating system protects the integrity of the samples by preventing solvent boil overs or the loss of volatile analytes. The integrated cover prevents any contaminants from entering the samples.

When combined with the present invention, oil and grease analysis can become completely automated for improved performance, efficiency and profitability. Better precision and accuracy are achieved in oil and grease analysis while significantly reducing turn-around time for analysis.

Figure 1:
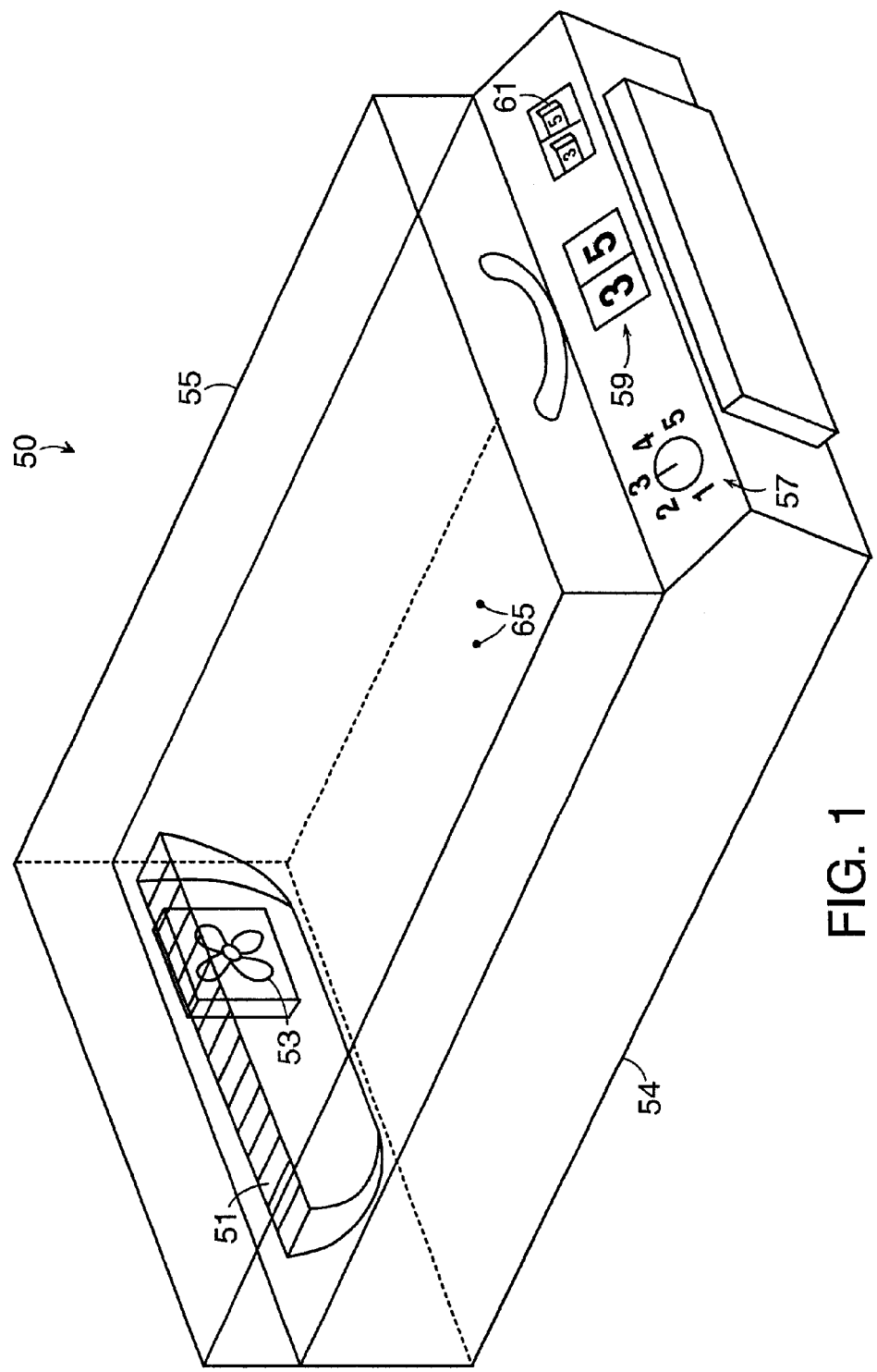
FIG. 1 is an isometric view of a preferred embodiment of the current invention.
Figure 2:
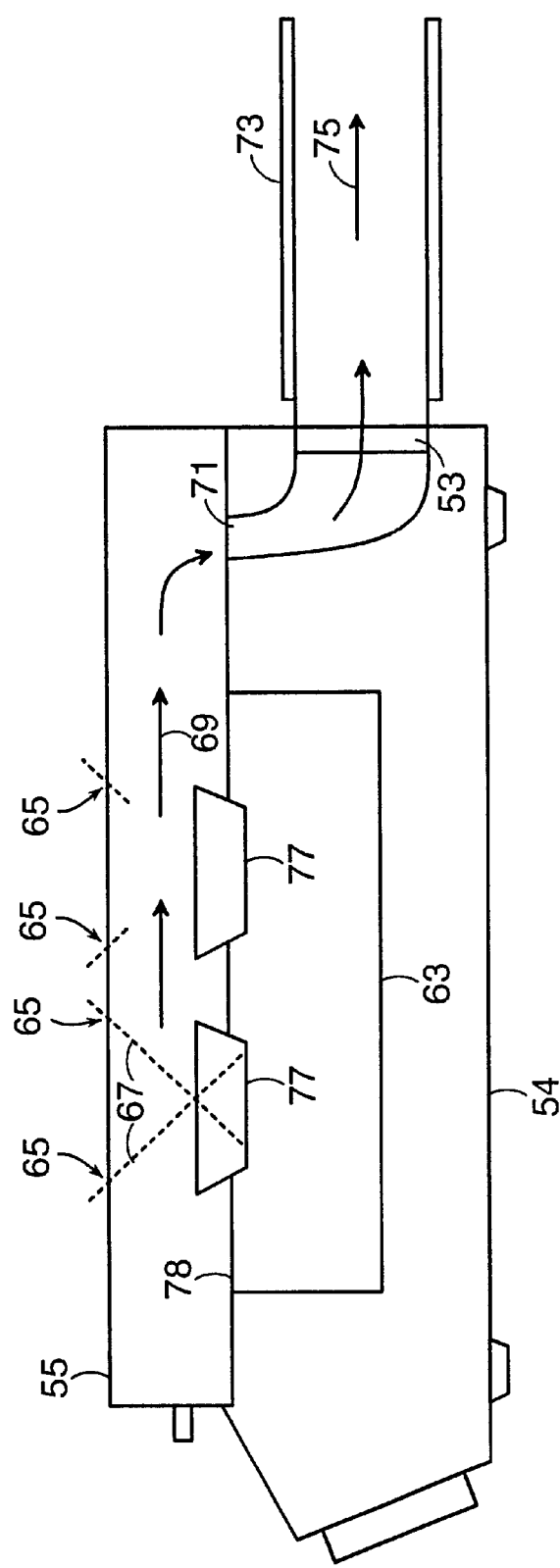
FIG. 2 is a side cutaway view of the embodiment of FIG. 1.

FIGS. 1 and 2 are isometric and side views respectively of a first preferred embodiment of the current invention. FIG. 1 shows the evaporator 50 without pans or pan tray for demonstration purposes. A cover 55 closes over the base 54. The fan 53 is turned on and its speed adjusted with fan controller 57. Air is drawn out of the unit by the fan 53 through optional filter 51, creating a vacuum which in turn draws room air in through inlets 65.

Pans 77 which hold the sample liquid sit on a pan tray 78. Under the pan tray 78, a heater element 63, adjusted by temperature control 61, warms the sample liquid. A digital display 59 indicates the temperature.

When the fan 53 is on, air is drawn across the tops of the pans 77 as indicated by arrows 69, facilitating the evaporation of the sample liquid. The air then passes through a vacuum port 71 in the pan tray 78, past the fan 53 and out an exhaust duct 73, as indicated by arrow 75. This withdrawal of air out through the fan 53 creates a vacuum which causes room air to be drawn in through inlets 65 in the cover 55, forming jets 67 of air which cross the slower flow 69 and which impinge on the surface of the sample liquid. These jets disturb the sample liquid, causing it to swirl, and increasing the rate of evaporation. As the air picks up moisture from the sample liquid, it rises and joins the slower flow 69 of air across the tops of the pans 77 and exits through the vacuum port 71 and exhaust duct 73.

Figure 3:
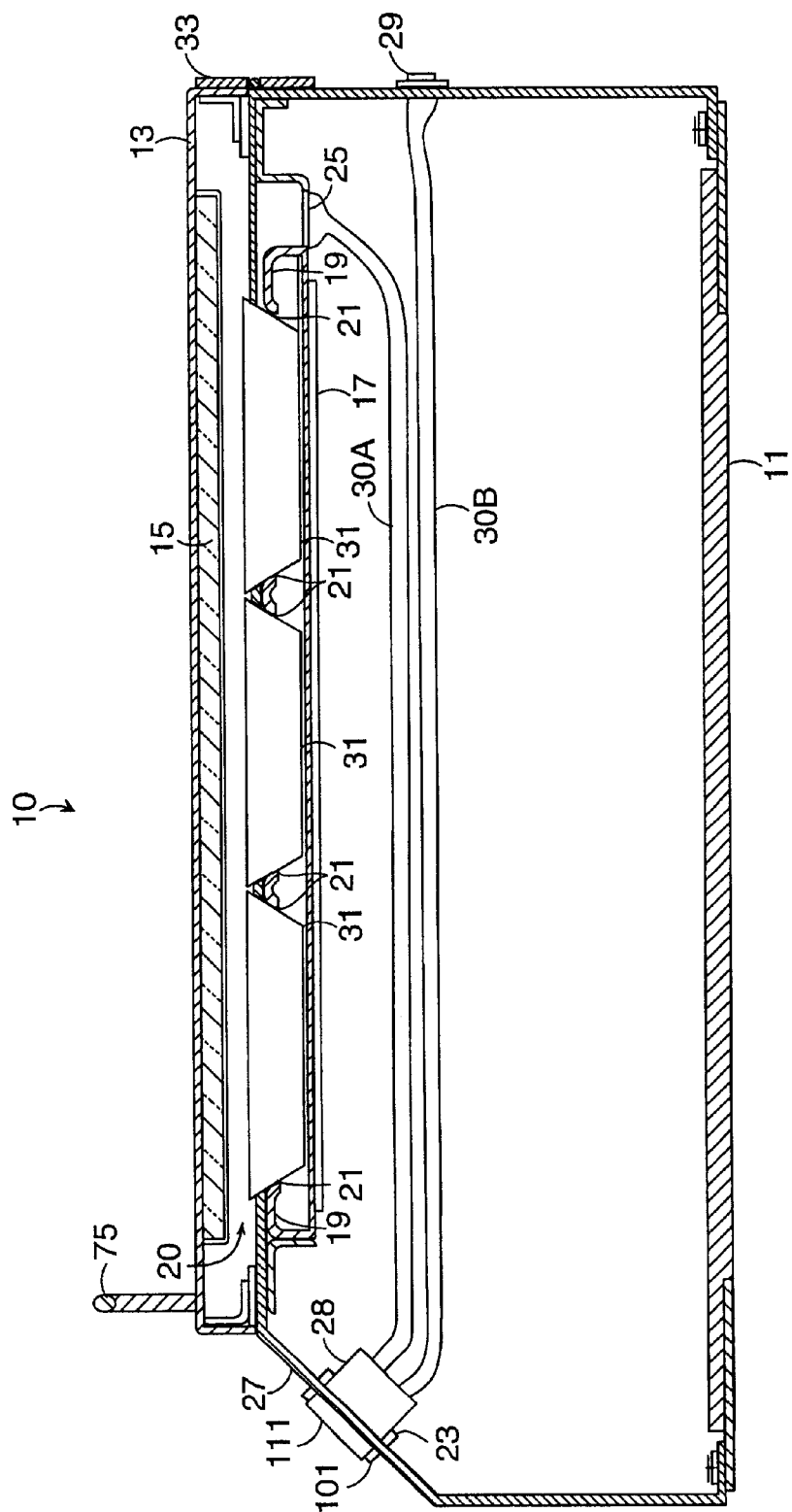
FIG. 3 is a side cutaway view of another preferred embodiment of the current invention.

FIG. 3 is a side cutaway view of another preferred embodiment of the current invention evaporator 10, which, having dimensions of approximately 12" wide by 16" deep by 6" high, is small enough to operate on a lab bench. The base 11 is relatively small and does not take up valuable lab space. The cover 13 is attached to the base 11 with hinge 33 so that the cover 13 can swing up, providing access to the inside. When the cover 13 is closed, the space between the cover 13 and pan tray 19 forms a sample chamber 20. A transparent plastic window 15, such as Plexiglas™, in the cover 13 allows visual observation of the sample chamber 20.

The pan tray 19 sits on the top of the base 11. In a preferred embodiment, the pan tray 19 provides seating 21 for nine pans in a three by three configuration. FIG. 3 shows three pans 31 in place. A vacuum fitting 25 at the rear of the pan tray 19 allows air to be drawn out of the chamber 20 through tube 30A to a shut-off valve 28 at the front panel 27. A second tube 30B carries the exhaust from the shut-off valve 28 to the vacuum outlet 29, where the exhaust is vented out of the unit. The shut-off valve 28 is controlled from a vacuum control knob 111.

A heater element 17 under the pan tray 19 warms the solvent to a desired temperature, preferably within a range of 20° to 70° Celsius, as set by a temperature control on the front panel 27 and controlled by temperature controller 23.

Figure 4:
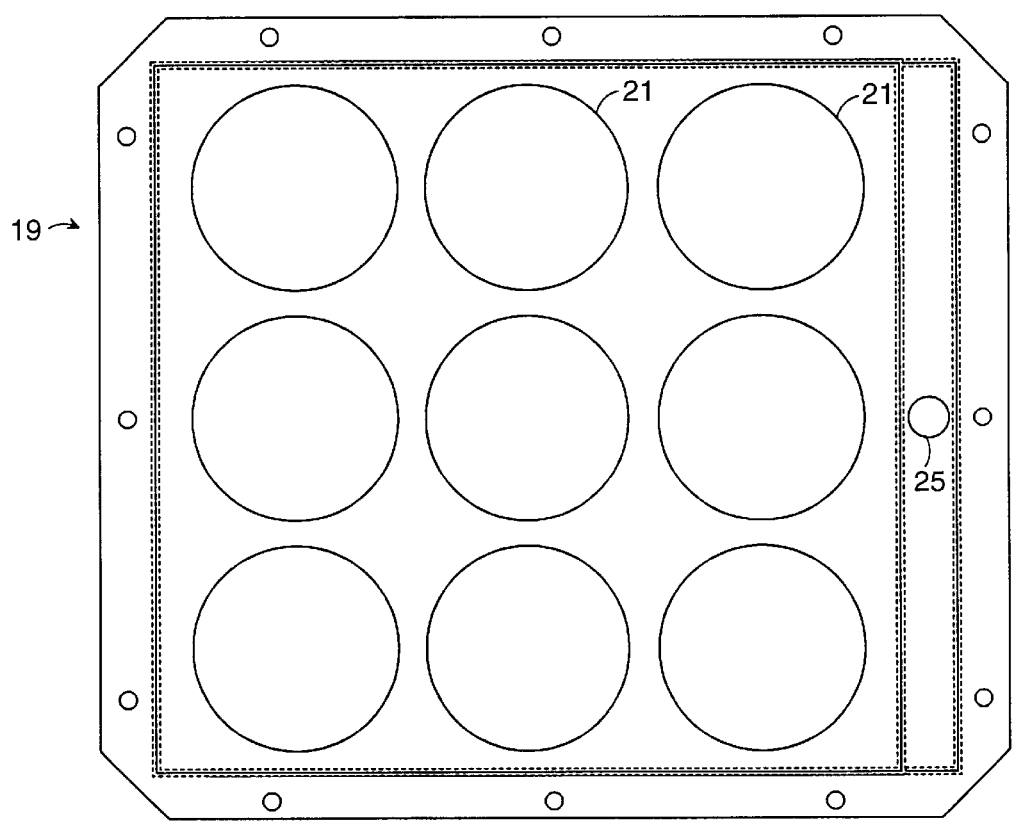
FIG. 4 is a top view of the pan tray of the embodiment of FIG. 3.

FIG. 4 is a top view of the pan tray 19, showing the nine pan-seating positions 21 and the vacuum fitting 25. Preferably, the pan tray 19 is aluminum. In addition, the pan tray 19 is removable and interchangeable with other trays which can hold different types of drying vessels such as beakers. A raised lip (not shown) around the edge of the tray 19 contains solvent spills and prevents solvent from running down inside the evaporator 10.

Figure 5A:
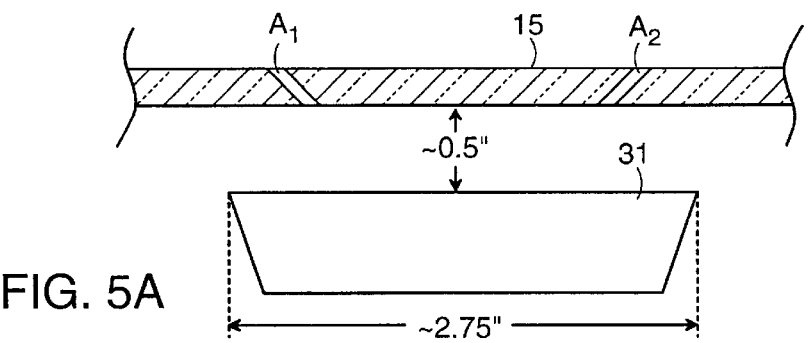
FIGS. 5A, 5B and 5C are two orthogonal side views and a top view respectively of a sample pan with respect to the plexiglass cover and inlets.
Figure 5B:
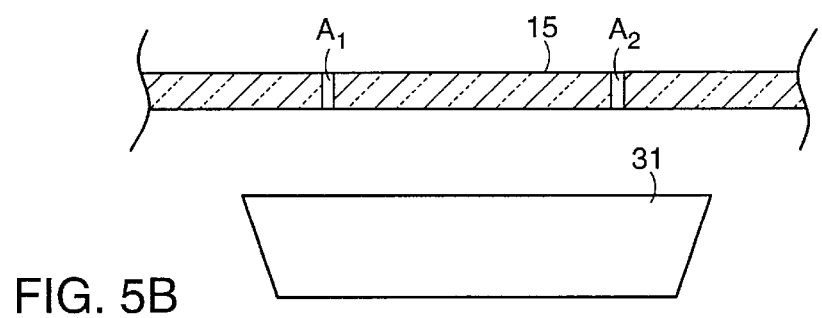
Figure 5C:
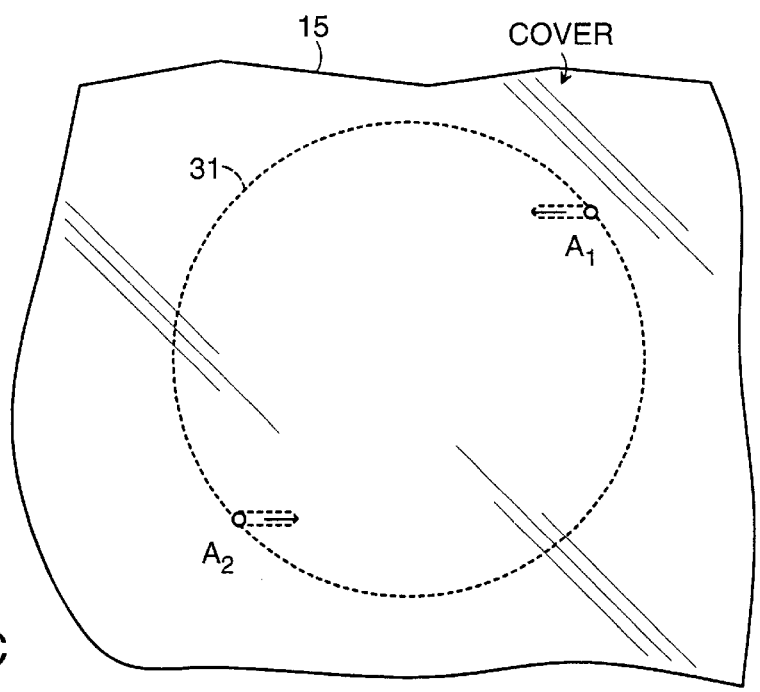

FIGS. 5A, 5B and 5C are two orthogonal side views and a top view respectively of a sample pan with respect to the plexiglass cover and inlets. In a preferred embodiment, the solvent is placed in commercially available pans 31 which are approximately 70 mm wide and 16 mm high, tapering outwardly toward the top. While pans of this particular size are commercially available, it will be apparent to one skilled in the art that pans of other sizes may also be used with a cover having inlets located appropriately above the pans.

Above each pan-seating position 21, there are two angled inlets A1, A2 in the cover 15. The inlets A1, A2 are aimed in opposite directions. A vacuum at the rear of the evaporator 10 pulls room air into the sample chamber 20 through inlets A1 and A2. Because the inlets A1, A2 are aimed in opposite directions at opposite sides of the liquid solvent, the drawn air impinges on the solvent, causing it to swirl, while the air itself picks up vapor from the solvent. A mixture of vapor-bearing air and incoming air is then drawn out of the back of the unit, across the tray 19, forming a flow of air over the open pans which further advances the evaporation process, and which exits through the vacuum fitting 25 and out the vacuum outlet 29.

Figure 6A:
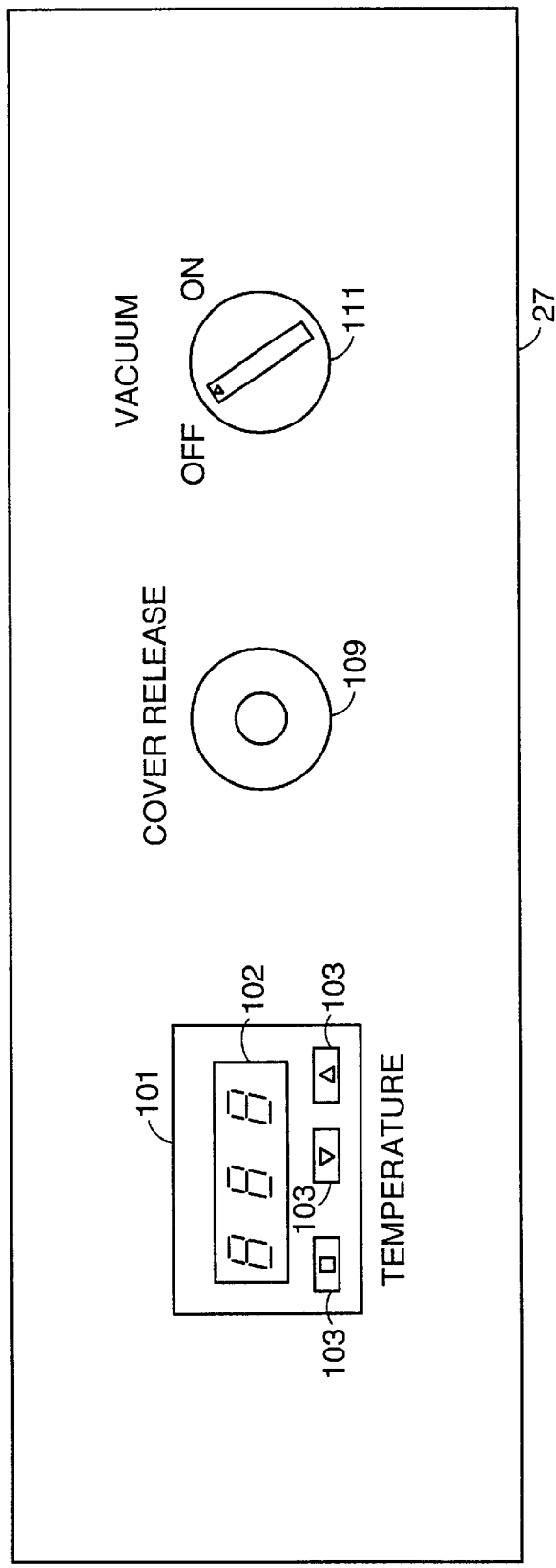
FIG. 6A is a view of a representative front panel of the present invention.

FIG. 6A is a front view of a representative front panel 27 of the present invention. Temperature control panel 101 comprises a display 102 which shows the current temperature inside the enclosure. Several controls 103 allow a user to adjust temperature control set points.

Vacuum control knob 111 is used to apply the vacuum from the vacuum source to the chamber 20, effectively turning the vacuum off or on. Preferably, the vacuum control knob 111 is connected to a shut-off valve 28 which either fully blocks the vacuum source or fully connects the vacuum source to the sample chamber 20. Alternatively, the strength of the vacuum can be adjustable by using, for example, a bleeder valve, in order to control the amount of air being pulled over the pans.

Cover release control 109 allows a user to lift the cover to access the pans without shutting the vacuum off by venting the chamber to the outside air. In an alternative embodiment, the vacuum is automatically shut off when the cover is opened.

Figure 6B:
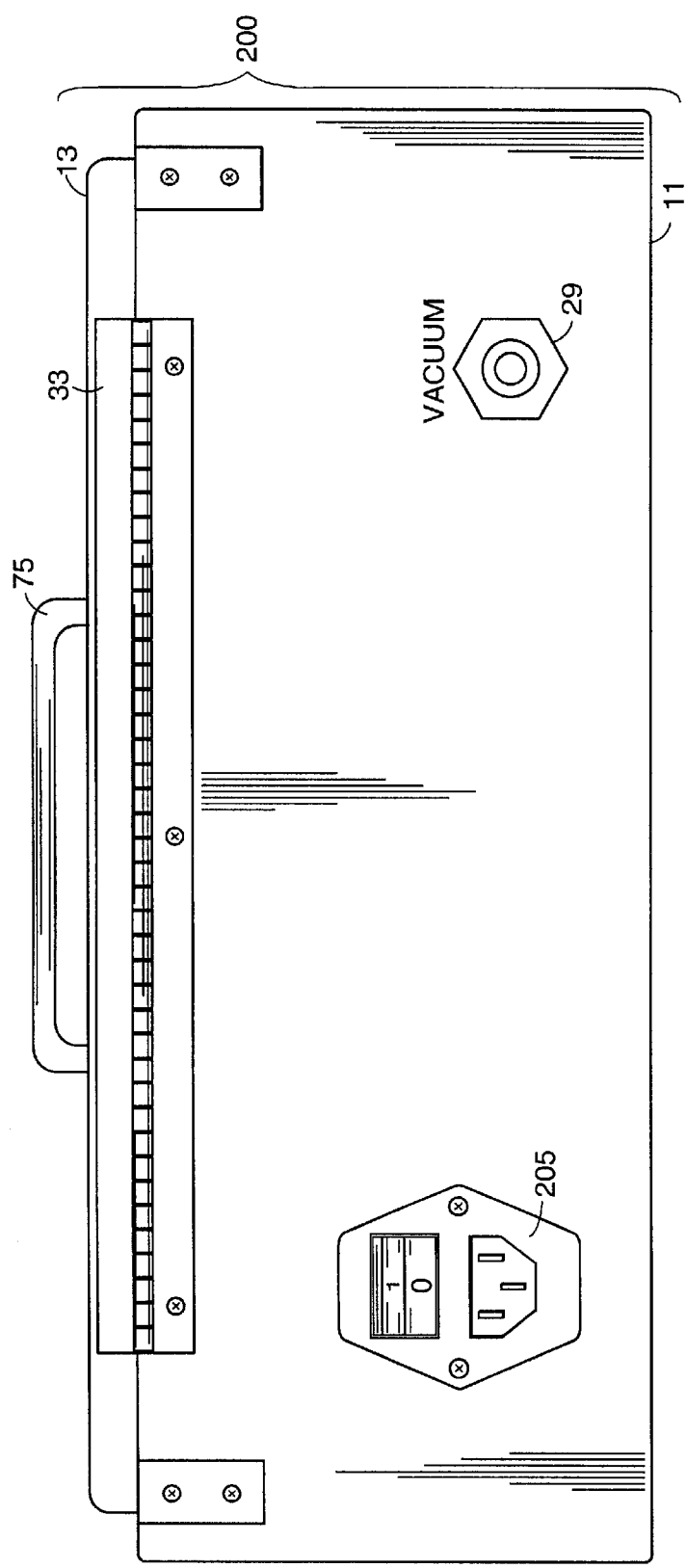
FIG. 6B is a rear view of a preferred embodiment of the present invention

FIG. 6B is a rear view of a preferred embodiment of the present invention. On the rear of the enclosure 200 is a combination power connector and power switch 205. A vacuum outlet 29 allows hookup to an external vacuum source. Also seen in FIG. 6B is the cover handle 75 and the cover hinge 33.

Prior to operation, pans 31 are filled with solvent and placed into the seating positions 21 of the pan tray 19. The cover 13 is closed, and the pans can be observed through the transparent window 15. Power is supplied to the evaporator when an operator depresses the system power switch 205. When the operator turns the vacuum control knob 111 to the ON position, room air is drawn into the sample chamber through inlets A1, A2 located above each pan seating position 21, and the solvent evaporates as discussed above.

Figure 7:
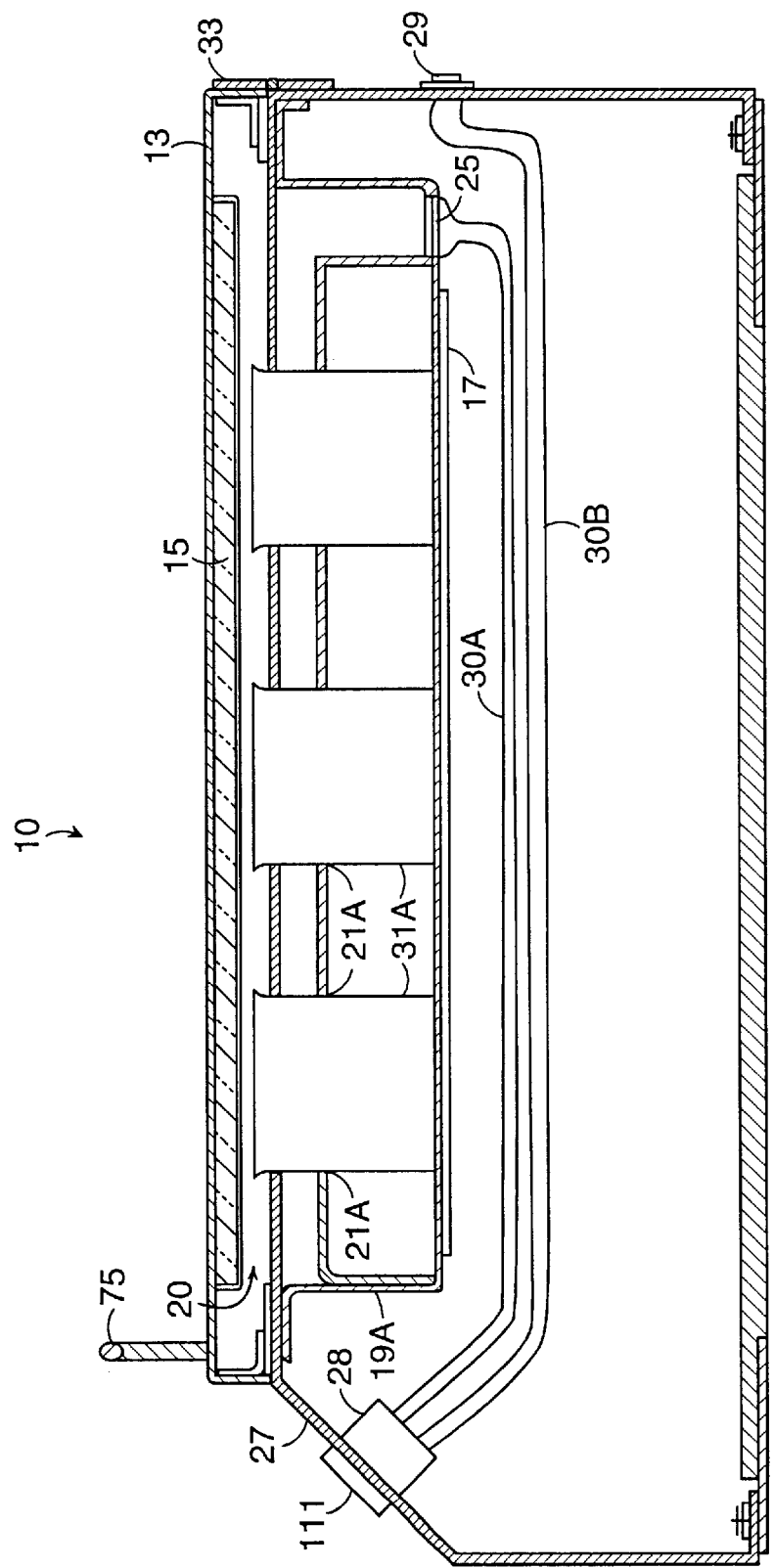
FIG. 7 is a side cutaway view of the embodiment of FIG. 3 fit with a beaker tray.

FIG. 7 is a side cutaway view of the embodiment of FIG. 3 fitted with a beaker tray 19A. Three beakers 31A are shown in the seating positions 21A.

Optionally, a solvent recovery system can condense, trap and collect the exhaust solvents.

US EPA Method 1664 for Oil and Grease Analysis via N-Hexane Extraction is a performance-based procedure. As such, the analyst has the flexibility to modify analytical conditions so as to optimize performance. One variable to be considered is the temperature at which to evaporate the extracted sample.

Using the present invention, data was collected at three different evaporation temperatures. Data to determine time to dryness and percent recovery of a 5 ml oil and grease standard spike in 30 ml of n-hexane was collected.

As expected, using a higher temperature significantly reduced evaporation time. At 35° Celsius, 35 ml of solvent evaporated in thirty minutes. At 55° Celsius, the same solution dried in eighteen minutes.

This data proves that evaporating at a higher temperature does not significantly affect recovery. The standard's percent recovery upon dryness at 55° Celsius was over 98%. However, it appears that some of the analytes in the standard are volatile enough to be lost after the sample goes to dryness under a partial vacuum. The higher the evaporation temperature, the more rapid this loss of analytes will occur.

In conclusion, the data demonstrates acceptable performance at all three evaporation temperatures. With the present invention, analysts are able to evaporate the extracted oil and grease samples as rapidly as required, contingent upon how closely they monitor the time to dryness of their samples. The consistent and precise temperature control provided by the present invention allows an analyst to predict this time to dryness with great accuracy. Any loss of analytes is thus minimized. Turn around times can be reduced without sacrificing the quality of the analytical results.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An evaporator, comprising:

a pan for holding sample liquid;

an enclosure having a seating position in which the pan is seated, the enclosure having a vacuum connection, the enclosure including a means suspended horizontally above the pan and the pan seating position, the means having at least one angled inlet over the pan seating position, the at least one angled inlet being aimed at the sample liquid within the seated pan; and an air drawing source for drawing air in through the at least one angled inlet such that the drawn air disturbs the sample liquid, and for creating an air flow across the top of the pan.

2. The evaporator of claim 1, wherein the pan is tapered outward from bottom to top.

3. The evaporator of claim 1, wherein the air-drawing source comprises a vacuum source.

4. The evaporator of claim 1, wherein the air-drawing source comprises a fan.

5. The evaporator of claim 1, wherein the air-drawing source is located at an end of the enclosure.

6. The evaporator of claim 1, wherein a plurality of angled inlets over the pan seating position are aimed at the sample liquid.

7. The evaporator of claim 1, wherein the enclosure may hold a plurality of pans, the enclosure having a plurality of angled inlets over each pan.

8. The evaporator of claim 1, wherein the at least one inlet is aimed downward at about 37° to 42°.

9. The evaporator of claim 1, wherein the pan is about 70 mm in diameter and about 16 mm high.

10. An evaporator, comprising:

a base, the base having a vacuum connection;

a tray fixed to the base, the tray having seating positions in which to seat pans; and a cover attached to the base, the cover having an open position and a closed position, the cover fitting over the tray and in the closed position forming a tight fit with the base, said cover having angled inlets over each pan seating position such that when a vacuum source is connected to the vacuum connection, air from outside the evaporator is drawn in through the inlets and aimed toward a sample liquid in each pan such that the sample liquid evaporates.

11. The evaporator of claim 10 further comprising at least one pan for holding sample liquid to be evaporated, the pan tapering outwardly from bottom to top.

12. The evaporator of claim 10, wherein the vacuum connection is located in the rear of the base.

13. The evaporator of claim 10 wherein each pan is about 70 mm in diameter and about 16 mm in height.

14. The evaporator of claim 10 wherein the cover has two inlets for each pan, aimed in opposite directions, and on opposite sides of each pan, such that when air strikes the sample liquid it induces a swirling motion.

15. The evaporator of claim 14 wherein the inlets are angled down from 37° to 42°.

16. The evaporator of claim 10 further comprising a heating unit connected to the base below the tray.

17. The evaporator of claim 10 wherein, when the cover is in the closed position, it is ¼" to ½" from the pans.

18. The evaporator of claim 10 wherein the vacuum is turned off when the cover is opened.

19. The evaporator of claim 10 wherein the cover is transparent.

20. An evaporator, comprising:

sample holding means for holding sample liquid;

enclosure means in which the sample holding means is placed, the enclosure means having at least one angled inlet means above the sample holding means, the inlet means aiming at the sample liquid within the sample holding means, the enclosure means comprising:

base means having a vacuum connection;

tray means fixed to the base means, the tray means having seating positions in which to seat the sample holding means; and cover means hingedly attached to the base means, the cover means having an open position and a closed position, the cover means fitting over the tray means and in the closed position forming a tight fit with the base means, said cover means comprising the angled inlet means over each sample holding means seating position such that when a vacuum means is applied, air from outside the evaporator is drawn in through the inlet means and aimed toward the sample liquid in each sample holding means such that the sample liquid evaporates; and air-drawing means for pulling air in through the inlet means such that the air contacts the sample liquid, and for creating an air flow across the top of the sample holding means.

21. The evaporator of claim 20, wherein the air-drawing means is located at an end of the enclosure means.

22. The evaporator of claim 20, wherein a plurality of inlet means are aimed at the sample liquid.

23. The evaporator of claim 20, wherein the enclosure means may hold a plurality of sample holding means, the enclosure means having a plurality of inlet means above each sample holding means.

24. The evaporator of claim 20, wherein the inlet means is aimed downward at about 37° to 42°.

25. The evaporator of claim 20 wherein the enclosure means has two inlet means over said sample holding means, aimed in opposite directions at opposite sides of the sample holding means, such that when air strikes the sample liquid it induces a swirling motion.

26. The evaporator of claim 20 wherein the inlet means are angled down from 37° to 42°.

27. The evaporator of claim 20 further comprising heating means connected to the enclosure means below the sample holding means.

28. The evaporator of claim 20 wherein the inlet means is ¼" to ½" from the sample holding means.

* * * * *